United States Patent
Chen et al.

(10) Patent No.: US 12,309,837 B2
(45) Date of Patent: May 20, 2025

(54) SYSTEM AND METHOD OF COLLISION-FREE ROAMING WIRELESS NETWORK WITH PACKET AND TIMING DIVISION CONTROLLING MULTIPLE ACCESS

(71) Applicant: BLUTECH INC., Taipei (TW)

(72) Inventors: Deral Chen, Taipei (TW); Tsai Li Lin, Taipei (TW)

(73) Assignee: BLUTECH INC., Taipei (TW)

( * ) Notice: Subject to any disclaimer, the term of this patent is extended or adjusted under 35 U.S.C. 154(b) by 255 days.

(21) Appl. No.: 18/164,737

(22) Filed: Feb. 6, 2023

(65) Prior Publication Data

US 2023/0269775 A1    Aug. 24, 2023

(30) Foreign Application Priority Data

Feb. 18, 2022    (TW) .................................. 111105906

(51) Int. Cl.
*H04W 74/0816*    (2024.01)
*H04W 60/04*    (2009.01)
*H04W 74/08*    (2009.01)

(52) U.S. Cl.
CPC ....... *H04W 74/0816* (2013.01); *H04W 60/04* (2013.01); *H04W 74/0866* (2013.01)

(58) Field of Classification Search
CPC ............. H04W 74/0816; H04W 60/04; H04W 74/0866
See application file for complete search history.

(56) References Cited

U.S. PATENT DOCUMENTS

| 8,626,172 | B2 | 1/2014 | Dravida et al. | |
|---|---|---|---|---|
| 11,234,254 | B2 | 1/2022 | Hareuveni et al. | |
| 2012/0008627 | A1 | 1/2012 | Chen et al. | |
| 2016/0057051 | A1* | 2/2016 | McAndrew | H04W 76/15 370/392 |
| 2018/0077619 | A1* | 3/2018 | Bitra | H04W 64/00 |
| 2019/0182745 | A1* | 6/2019 | Molinier | H04W 8/08 |
| 2021/0327250 | A1* | 10/2021 | Waters | G06F 18/256 |
| 2023/0269775 | A1* | 8/2023 | Chen | H04W 24/02 370/329 |

FOREIGN PATENT DOCUMENTS

| TW | 201123771 A | 7/2011 |
|---|---|---|
| TW | 201216649 A | 4/2012 |
| TW | 202127850 A | 7/2021 |

* cited by examiner

*Primary Examiner* — Ajay Cattungal
(74) *Attorney, Agent, or Firm* — Best & Flanagan LLP

(57) ABSTRACT

A collision-free roaming wireless network includes a main server, at least one base station, at least one end device; the main server and the at least one base station are in an external communication network; the main server obtains basic information of the at least one base station; each of the at least one end device transmits individual information attributes to any one of the at least one base station; and each of the at least one base station transmits the information attributes received from end devices to the main server, and based on received basic information of the at least one base station and received information attributes of the at least one end device, the main server generates an affiliation table, which records affiliation of each of the at least one end device with one of the at least one base station, and then the network is established accordingly.

11 Claims, 2 Drawing Sheets

SYSTEM AND METHOD OF COLLISION-FREE ROAMING WIRELESS NETWORK WITH PACKET AND TIMING DIVISION CONTROLLING MULTIPLE ACCESS

CROSS REFERENCE TO RELATED APPLICATION(S)

This non-provisional application claims the benefit under 35 U.S.C. § 119(e) to patent application No. 111105906 filed in Taiwan on Feb. 18, 2022, which is hereby incorporated in its entirety by reference into the present application.

BACKGROUND OF THE INVENTION

1. Field of the Invention

The present invention relates to a multiple access wireless network system, especially to a system and method of a collision-free roaming wireless network with packet and timing division controlling multiple access.

2. Description of the Related Art

In recent decades, especially when the internet of things (IoT) is expected to boom in the near future, there emerge more wireless technologies with respective advantageous features from various prospects, including but not limited to, Low-Power Wide-Area Network (LPWAN), Wi-Fi, 5G, etc. Presently, when a certain base station or a receiver receives signals from other end devices in a wireless network, problems of packet collisions and interferences still need to be confronted. Accordingly, there are many methods intentionally developed to resolve or improve problems of wireless packet collisions.

Firstly, a general wireless network is deployed by topologies of a star or a peer-to-peer or a mesh. Among the wireless network topologies above, there are a plurality of network devices using random-access mechanism to broadcast and receive data signals which easily causes packet collisions in the wireless network when large numbers of end devices try to access one receiver device. Furthermore, in a conventional wireless network technology, a moving transceiver at various locations can keep its connection to a wireless network even when the moving transceiver is at locations between wireless networks, and ordinarily, said connection still utilizes a typical random-access method in conjunction with a wireless local area network (WLAN) roaming method to remain valid in the networking service which very often has a short disconnected period and then rejoins to certain wireless sensor network (WSN) later.

Even though there are many methods focusing on wireless packet collisions, said methods can only improve or reduce the wireless packet collision problems.

The standards of IEEE regulations about wireless technologies always show a wireless sensor network (WSN) allowing any end device requesting to join a network with or without authorization, by only acquiring the identity of the end device and the time the end device allowed to join the network. In the past, Radio Frequency (RF) communication technology and its Medium Access Control (MAC) are usually developed based on ALOHA mechanism which is well known as "Random access". As "random" means, there are no clear rules to decide which end device and at what time said end device is allowed to join a network, and the signals contain payload or data carrier over the air in various data rates. As mentioned above, the random-access will cause the wireless packet collisions to happen frequently, and many methods come to reduce or improve such problems and among which, many of the methods are based on Time Division Multiple Access (TDMA) and Frequency Division Multiple Access (FDMA), and some methods adopt technical means such as bypass confliction of a shared receiving channel, distribution of timeslots of TDMA affairs or both. Many conventional methods are based on listening to available channels before sending packets when all devices in the networking send and receive on the same channel by either CSMA/CD (carriers sense multiple access with collision detection) or by CSMA/CA (carriers sense multiple access with collision avoidance) for the avoidance of wireless packet collisions. Those methods try to resolve or reduce the problem about packet collisions by providing channel preemption communication mechanism which has different means such as finding available timeslots or detecting available channels, etc. and among which, some are well known like TDMA and FDMA.

The basic philosophy of a majority of the above-mentioned methods is about the random-access to any end device's free broadcast, so till the present, existing methods cannot significantly reduce, let alone completely avoid the packet collisions which cause dropped transmitted data, when there are certain numbers of end devices with hundreds of wireless signals in the air and under very limited bandwidth conditions. Regarding the above deficiencies in the prior art, there is an urgent need to resolve the above-mentioned problems of packet collisions in the multiple access wireless network systems.

SUMMARY OF THE INVENTION

In order to resolve the above-mentioned problems, the present invention discloses a system and method of a collision-free roaming wireless network with packet and timing division controlling multiple access, so as to manage a wireless network or a WSN and to eliminate packet collisions.

The collision-free roaming wireless network of the present invention manages not only the wireless connectivity and data transmission of all static devices in a WSN environment but also moving devices across bordering WSNs.

With the same method, the invention can also specifically improve the connectivity and data transmission when an end device is moving within a range of a WSN. The present invention builds a secure WSN which guarantees wireless connectivity with collision-free data transmission.

The present invention discloses a system of a collision-free roaming wireless network which includes:
  a main server, having functions of a network server;
  at least one base station, having both the functions of a wireless base station and a gateway;
  at least one end device, having both wireless communication capabilities and a specific application;
  wherein the main server and the at least one base station are in an external communication network, and the main server connects to the at least one base station through the external communication network to obtain basic information of the at least one base station; and
  each of the at least one end device has information attributes, and when each of the at least one end device communicates wirelessly with any one of the at least one base station, each of the at least one end device will transmit individual information attributes to any one of the at least one base station; and each of the at least one base station transmits the information attributes received from the at least one end device to the main server, and based on received basic information of the at least one base station and received information attributes of the at least one end device, the main server generates an affiliation table, which records affiliation of each of the at least one end device with one of the at least one base station; and each of the at least one base station receives the affiliation table from the main server, and broadcasts an available channel for joining signaling (ACJ signaling) to discover all of the at least one end device affiliated therewith; and when each of the at least one end device receives an ACJ signaling and sends a joining request signaling (JR signaling) in response, each of the at least one end device completes registration with its affiliated base station according to the affiliation table.

Preferably, the basic information of each of the at least one base station includes: sensing of temperature, humidity, pressure, vibration, brightness, wind speed, air quality, chemical substances, sound, or images of an environment, or monitoring of production lines, security monitoring, or warning/alarming.

Preferably, the basic information of the at least one base station includes: available channels, channel frequencies, or free timeslots.

Preferably, the information attributes of each of the at least one end device include: a preamble length, an end device ID, an end device type, a channel frequency, a payload length or a receiving signal strength indicator (RSSI).

Preferably, the end device type comprises the specific application and the channel frequency of an end device.

Preferably, each of the at least one base station broadcasts ACJ signaling in a predetermined period.

Preferably, when each of the at least one end device receives ACJ signaling from each of the at least one base station, and before responding to the ACJ signaling by sending JR signaling, said end device determines that the base station meets the following conditions:
the base station has an available channel;
the base station and the end device utilize the same frequency; and
whether the RSSI of broadcasted information from the base station and received by the end device exceeds a predetermined threshold.

Preferably, within a communication range of a base station and when the base station detects RSSI of signals from one of the at least one end device is less than a threshold for multiple times, a connection priority between the base station and said one of the at least one end device according to the affiliation table will be nullified or downgraded.

The present invention furthermore discloses a method of a collision-free roaming wireless network which includes:
providing a main server having functions of a network server, at least one base station having both functions of a wireless base station and a gateway, at least one end device having both wireless communication capabilities and a specific application, and the main server and the at least one base station being an external communication network; the method including the following steps:

step 1: the main server connecting to the at least one base station through the external communication network to obtain free timeslots of available channels of the at least one base station;

step 2: when the main server determines that no response is received from the at least one base station, returning to step 1;

step 3: the at least one base station broadcasting an available channel for joining signaling (ACJ signaling) in a predetermined period, wherein the ACJ signaling comprises a channel frequency and an IP address of the at least one base station;

step 4: when the at least one base station determines that a receiving signal strength indicator (RSSI) of the at least one end device is less than or equal to a threshold, returning to step 3;

step 5: the main server obtaining information attributes of the at least one end device through the external communication network;

step 6: the at least one base station calculating an average RSSI value of all of the at least one affiliated end device therewith, and then the priority of a connection between one of the affiliated end devices and the at least one base station being determined according to the average RSSI value, the RSSI value and the relative location of the affiliated end device with respect to the at least one base station;

step 7: the main server determining which base station the at least one end device should affiliate with, based on the RSSI value or relative location of the at least one end device with respect to each of the at least one base station;

step 8: when the at least one end device is connected with an affiliated base station assigned by the main server, the at least one end device continuing to transmit information attributes including the RSSI.

In sum, the above-mentioned contents disclose the three-tier structure of the system of a collision-free roaming wireless network of the present invention, and the method to establish the system of a collision-free roaming wireless network to achieve the purposes of the present invention.

DETAILED DESCRIPTION OF THE INVENTION

In the following, the technical solutions in the embodiments of the present invention will be clearly and fully described with reference to the drawings in the embodiments of the present invention. Obviously, the described embodiments are only a part of, not all of, the embodiments of the present invention. Based on the embodiments of the present invention, all other embodiments obtained by a person of ordinary skill in the art without creative efforts shall fall within the protection scope of the present invention.

Figure 1:
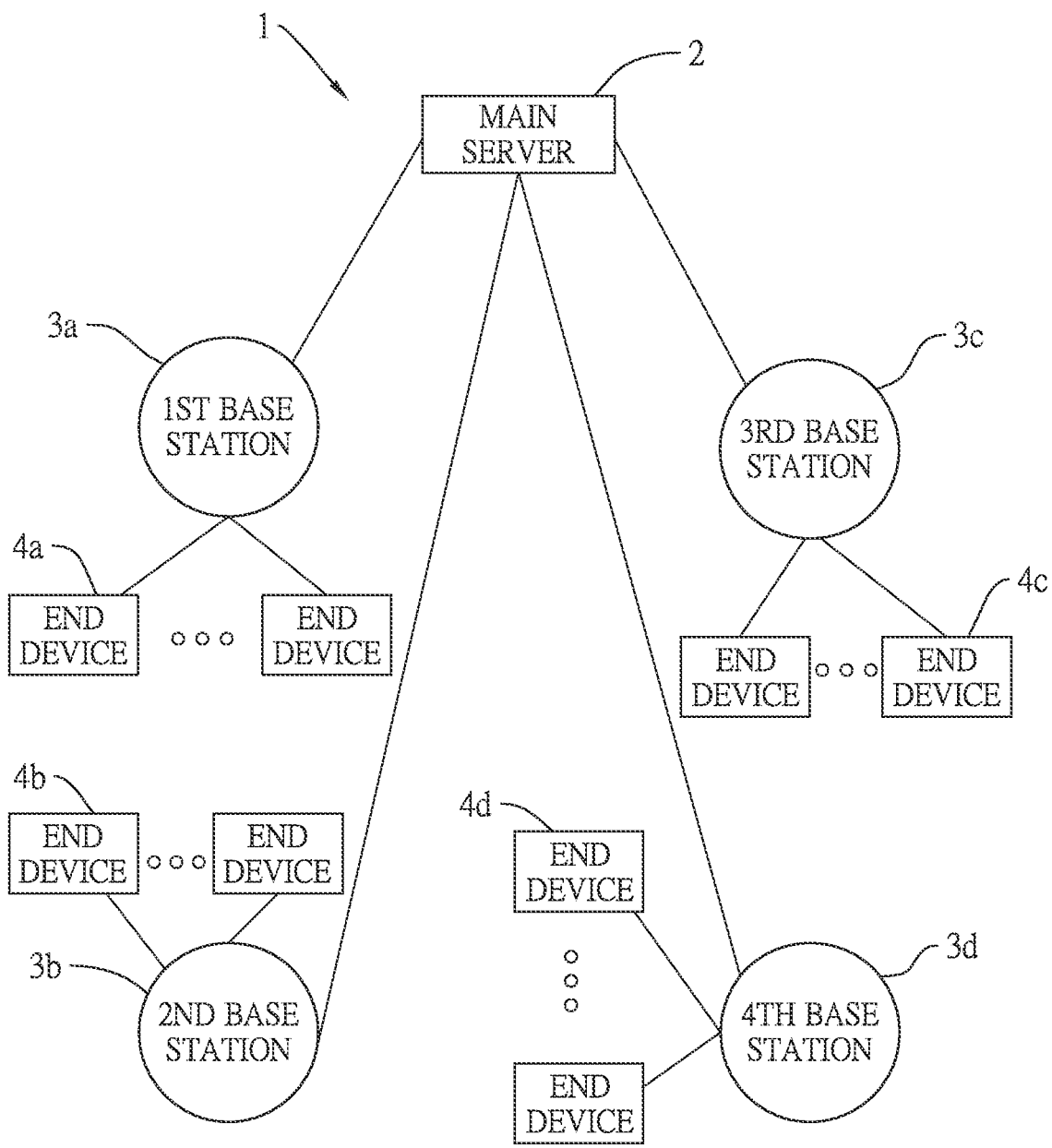
FIG. 1 shows a three-tier structure of a collision-free roaming wireless network with packet and timing division controlling multiple access of the present invention.

Please refer to FIG. 1. FIG. 1 is about a three-tier structure of a collision-free roaming wireless network with packet and timing division controlling multiple access (hereinafter abbreviated as collision-free roaming wireless network) of the present invention. The collision-free roaming wireless network 1 has a three-layer structure, wherein the first layer includes a main server 2 which is a server, and the second layer includes base stations 3a, 3b, 3c, 3d which are wireless base stations with functions of gateways, the third layer includes end devices (i.e. end nodes) 4a, 4b, 4c, 4d, which are, for example, sensors with wireless communication capabilities.

Before the collision-free roaming wireless network 1 is established, the above-mentioned main server 2, base stations 3a, 3b, 3c, 3d and the end devices 4a, 4b, 4c, 4d are required to fulfill the following basic technical requirements to implement a collision-free roaming wireless network of the present invention.
  (1) The main server, base stations and the end devices must be equipped with sufficient computing power, such as microcontroller unit (MCU) or central processing unit (CPU) or cloud computing environment.
  (2) The radio frequency (RF) broadcasting of the main server, base stations and the end devices are compatible with each other to ensure that all parties can communicate by transmitting/receiving data or payload.
  (3) Minimum bandwidth for each of the main server, the base stations and the end devices is required to support basic information exchange.
  (4) Basic information of transmitted data is required to have an identification code (i.e. ID) therein.
  (5) When a base station or an end device receives a signaling from a transmitter, the base station or the end device is required to echo to the transmitter.
  (6) Payload size has to be constrained and regulated to conform to an average transmission timeslot.
  (7) It is very important to synchronize time between all parties via a synchronization mechanism, especially for the time synchronization between relevant end devices and base stations, so as to facilitate utilization of positioning methods such as Time of Arrival (ToA) positioning method or Time difference of arrival (TDoA) positioning method.
  (8) The main server and its related base stations must be in an external communication network including, but not limited to, wireless sensor network (WSN), local area network (LAN), wide area network (WAN), Intranet, Internet, mobile network or satellite network, etc.

Establishment of the collision-free roaming wireless network 1 starts from a main server. The main server connects reachable base stations to get their respective basic information including available channels, channel frequencies, and resource allocations like free timeslots, etc. Then, the base stations will respond to the main server with their respective basic information, so as to complete a first handshaking between the main server and the base stations. When the main server has collected basic information from all reachable base stations, then among which the main server selects a base station as a redundant server for the collision-free roaming wireless network 1. The main server and the redundant server are deployed to maintain high utilization rate of the collision-free roaming wireless network 1. The main server and the redundant server can be both active or, one active and the other standby. The main server's primary role is to manage said all reachable base stations. After a redundant server is selected, the rest of said all reachable base stations start to communicate with all end devices and to collect information attributes therefrom, and the information attributes include: a preamble length, an end device ID, an end device type, a channel frequency, a payload length and a receiving signal strength indicator (RSSI), etc. The main server manages communication links between base stations and end devices based on the information attributes.

In the present invention, the developer or others predefine specific applications of the end devices, such as the sensing of environmental factors such as temperature, humidity, pressure, vibration, brightness, wind speed, air quality, chemical substances, sound, and images, or production line monitoring, safety monitoring, warning/alarming and many other specific applications of different natures. In the present invention, the end devices use a multitude of channel frequencies, for example, a channel frequency of certain end device is 901 MHz, and a channel frequency of other end device is 421 MHz etc.; accordingly, in the present invention, an end device type is used to indicate a specific application and a channel frequency of the end device, hence all end devices with the same specific application and channel frequency have the same "end device type".

In the present invention, a base station must be equipped with software or hardware corresponding to a specific application in order to support the specific application for end devices; however a base station may not necessarily support all applications for end devices, likewise a base station may not support all channel frequencies of end devices. For example, some base stations support communication channels of 910-920 MHz, 810-820 MHz and 410-420 MHz, while others support communication channels of 920-930 MHz, 820-830 MHz and 420-430 MHz, etc. Therefore, all base stations that support end devices of a particular end device type can form a base station cluster. And a base station may belong to multiple base station clusters.

Therefore, the end device type is an important key attribute, which defines which base station cluster an end device affiliates with. And the end device is automatically assigned to affiliate with said base station cluster which is responsible for roaming or joining requests from the end device.

Specifically, when an end device receives a broadcast of an available channel for joining signaling (ACJ signaling) from a base station, the end device needs to determine that the base station shall meet the following conditions:
  (1) the base station has an available channel;
  (2) the base station and the end device utilize the same frequency;
  (3) if the receiving signal strength indicator (RSSI) of broadcasted information received by the end device exceeds a predetermined threshold (e.g. 3-125 dbm).

After the end device determines the conditions above, the end device is awakened by the base station and responds to the ACJ signaling received from the base station by sending a joining request signaling (JR signaling) and starting to transmit the end device's information attributes to the base station. The ACJ signaling includes the channel frequency (CH_Freq) of the base station and the IP address (IP_add) of the base station.

Then, when the base station receives the information attributes of the end device, the base station sends the information attributes of the end device to a main server, and the main server optimally assigns the end device to affiliate with a base station, which means that according to an algorithm, the main server prepares an affiliation table which records that the end device is optimally affiliated with a base station corresponding to the end device type. The main server will continue to perform the above actions until all end devices are assigned to affiliate with corresponding base stations.

All base stations receive the affiliation table from the main station, and the affiliation table records each base station's affiliated end devices and quantity thereof. Afterwards, each base station broadcasts ACJ signaling to discover end devices affiliated with the base station which are listed in the affiliation table, and then each base station uses RSSI values of all affiliated end devices therewith to calculate an average RSSI value, and then a base station having a larger average RSSI value will be given a higher priority to establish a connection network between the base station and the affiliated end devices therewith, in addition, RSSI value and location of an end device will also affect the connection priority which means that the connection between the base station and the end device is established according to a priority order based on the average RSSI value calculated by the base station, the RSSI value of the end device and the location of the end device. When end devices affiliated with a base station join a network of the base station by order, the base station still broadcasts ACJ signaling in a predetermined timeslot, e.g. broadcasting ACJ signaling once every 5 seconds, but not limited to this, and the end device responds by sending JR signaling after receiving the ACJ signaling, accordingly the connection between the base station and the end device is established one by one until all the end devices affiliated with the base station are connected to the base station. In this way, each affiliated end device is added to the zero-collision roaming wireless network 1, therefore, the zero-collision roaming wireless network 1 is established.

Distinctive from random access or first-in-first-out methods of available channels, and within a communication range of the zero-collision roaming wireless network 1, each device of the present invention must satisfy major basic technical requirements, in particular the above-mentioned (6) payload size constrained and regulated to conform to an average transmission timeslot; and (7) time synchronization between all parties; in addition, during a process of establishing network connections between the base station and all affiliated end devices therewith, the base station uses a confirmation method to control multiple access to ensure the network connections. For example: monitoring whether RSSI value of any end device is smaller than the threshold for multiple times within communication ranges of all base stations managed by the main server and the redundant server, to determine whether the network connection is good or bad; or using traditional network signal confirmation frame to determine whether the network connection is good or bad. If a connection between an end device and a base station is determined to be bad, the priority of the connection will be nullified or lowered.

The main server manages the data uploaded by the base stations, which mainly includes basic information of the base stations and the information attributes of each end device received by the base stations, and various types of tables are utilized to keep record, wherein said tables are based on (but not limited to) relational database, certain formats, or even certain formatted text techniques to record each piece of information. For a main server, there will be a record format called a main table, which records the details of matching results of all end devices and their registration status. When this record is created, its registration information will be downloaded to a relevant base station cluster, and only in this base station cluster, a joining request can be initiated, otherwise all base stations keep broadcasting and searching for end device for a certain frequency and for a period of time. For a base station, there will also be a record format called a routing table, which is used to record all the detailed information of each end device that has been connected to the base station, including but not limited to, time, payload information, ID, and MAC address. Records of both the above-mentioned main table of the main server and the routing table of the base station are crucial to the present invention, and affect methods of managing wireless packets, especially on how to establish a connection, and receive payload data and related actions. However, the present invention hardly requires the end device to have any record of the above tables, because the method of the present invention mainly uses base stations to manage the connections of all end devices, and the record of the table on the end device is only used for system log and not for network management.

When a connection is established between a base station and an end device, especially for acquiring RSSI and other reference values that can identify whether the end device is moving or in a static state, the end device will continue to transmit information attributes and payload data. Each end device joins a network of a base station, and then all base stations will upload the moving or static status of all affiliated end devices therewith to the main server. If a particular end device is identified by the main server as being in a moving state, the main server will recalculate variable values of the moving end device to determine which base station is to accept a request to join network from the moving end device without re-registration among all base stations for the moving end device.

Figure 2:
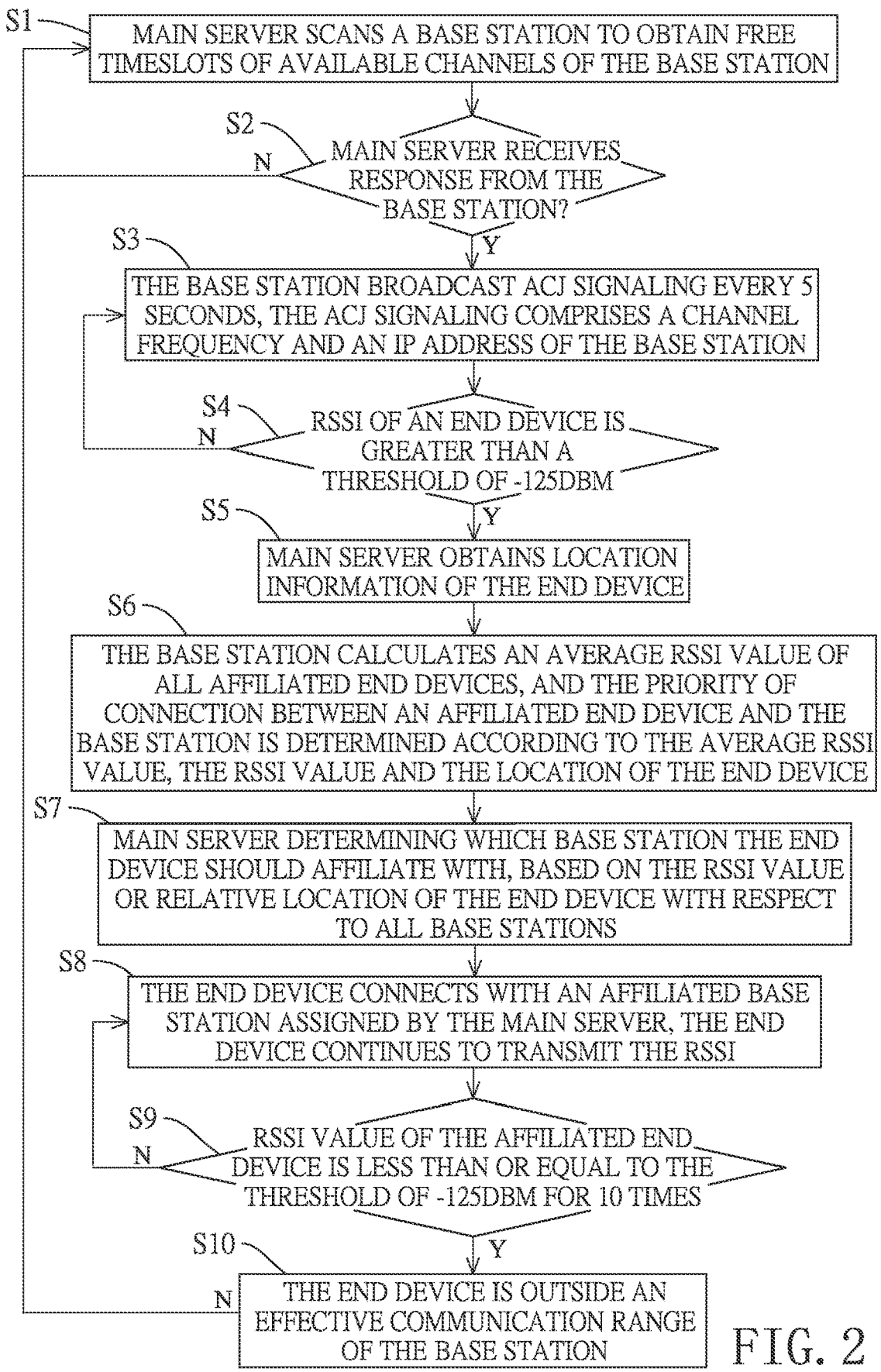
FIG. 2 shows an initiation flow chart of a collision-free roaming wireless network with packet and timing division controlling multiple access of the present invention.

Please refer to FIG. 2, according to the disclosure above and certain technical details supplement, the establishment flow of the zero-collision roaming wireless network 1 can be described by the following steps:

Step 1: A main server scans a base station to obtain free timeslots of the available channel of the base station;

Step 2: The main server determines whether it has received responses from the base station, when the main server does not receive any response from the base station, the flow returns to step 1;

Step 3: the base station broadcasts ACJ signaling every 5 seconds, but not limited to this, which includes channel frequency (CH_Freq) and IP address (IP_add) of the base station;

Step 4: The base station determines whether a RSSI value of the end device is greater than a threshold, when the RSSI value of the end device is less than or equal to the threshold, the flow returns to step 3;

Step 5: The main server obtains location information of the end device;

Step 6: The base station calculates an average RSSI value of all affiliated end devices, and then the priority of connection between an end device and the base station is determined according to the average RSSI value, the RSSI value and the location of the end device;

Step 7: The main server decides which base station the end device should affiliate with, based on the RSSI values or relative locations of the end device with respect to each base station;

Step 8: After a base station is connected with the affiliated end device, the affiliated end device continues to transmit its RSSI value;

Step 9: When the base station determines that the RSSI value of the affiliated end device is less than or equal to the threshold for less than 10 times, the flow returns to step 3;

Step 10: The base station notifies the main server that the end device is outside an effective communication range of the base station, the flow returns to step 1.

The above content discloses the basic structure of the collision-free roaming wireless network, and the process of constructing an initial network of the present invention, hence the purpose of the present invention can be achieved.

The aforementioned are preferred embodiments of the present invention. It should be noted that for those of ordinary skill in the art, without departing from the principles of the present invention, certain improvements and retouches of the present invention can still be made, which are nevertheless considered as within the protection scope of the present invention.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A system of a collision-free roaming wireless network with packet and timing division controlling multiple access, including:
   a main server, having functions of a network server;
   at least one base station, having both the functions of a wireless base station and a gateway;
   at least one end device, having both wireless communication capabilities and a specific application;
   wherein the main server and the at least one base station are in an external communication network, and the main server connects to the at least one base station through the external communication network to obtain basic information of the at least one base station; and
   each of the at least one end device has information attributes, and when each of the at least on end device communicates wirelessly with any one of the at least one base station, each of the at least one end device will transmit individual information attributes to any one of the at least one base station; and
   each of the at least one base station receives the affiliation table from the main server, and broadcasts an available channel for joining signaling (ACJ signaling) to discover all of the at least one end device affiliated therewith; and
   when each of the at least one end device receives an ACJ signaling and sends a joining request signaling (JR signaling) in response, each of the at least one end device completes registration with its affiliated base station according to the affiliation table.

2. The system of a collision-free roaming wireless network as claimed in claim 1, wherein the basic information of each of the at least one base station includes: sensing of temperature, humidity, pressure, vibration, brightness, wind speed, air quality, chemical substances, sound, or images of an environment, or monitoring of production lines, security monitoring, or warning/alarming.

3. The system of a collision-free roaming wireless network as claimed in claim 1, wherein the basic information of the at least one base station includes: available channels, channel frequencies, or free timeslots.

4. The system of a collision-free roaming wireless network as claimed in claim 1, wherein the information attributes of each of the at least one end device include: a preamble length, an end device ID, an end device type, a channel frequency, a payload length or a receiving signal strength indicator (RSSI).

5. The system of a collision-free roaming wireless network as claimed in claim 4, wherein the end device type comprises the specific application and the channel frequency of an end device.

6. The system of a collision-free roaming wireless network as claimed in claim 1, wherein each of the at least one base station broadcasts ACJ signaling in a predetermined period.

7. The system of a collision-free roaming wireless network as claimed in claim 1, when each of the at least one end device receives ACJ signaling from each of the at least one base station, and before responding to the ACJ signaling by sending JR signaling, said end device determines that the base station meets the following conditions:
   the base station has an available channel;
   the base station and the end device utilize the same frequency; and
   whether the RSSI of broadcasted information from the base station and received by the end device exceeds a predetermined threshold.

8. The system of a collision-free roaming wireless network as claimed in claim 1, wherein within a communication range of a base station and when the base station detects RSSI of signals from one of the at least one end device is less than a threshold for multiple times, a connection priority between the base station and said one of the at least one end device according to the affiliation table will be nullified or downgraded.

9. The system of a collision-free roaming wireless network as claimed in claim 7, wherein a value of the threshold is −125 dbm.

10. The system of a collision-free roaming wireless network as claimed in claim 8, wherein a value of the threshold is −125 dbm.

11. A method of a collision-free roaming wireless network with packet and timing division controlling multiple access, providing a main server having functions of a network server, at least one base station having both functions of a wireless base station and a gateway, at least one end device having both wireless communication capabilities and a specific application, and the main server and the at least one base station being in an external communication network; the method including the following steps:
   step 1: the main server connecting to the at least one base station through the external communication network to obtain free timeslots of available channels of the at least one base station;
   step 2: when the main server determines that no response is received from the at least one base station, returning to step 1;
   step 3: the at least one base station broadcasting an available channel for joining signaling (ACJ signaling) in a predetermined period, wherein the ACJ signaling comprises a channel frequency and an IP address of the at least one base station;
   step 4: when the at least one base station determines that a receiving signal strength indicator (RSSI) of the at least one end device is less than or equal to a threshold, returning to step 3;
   step 5: the main server obtaining information attributes of the at least one end device through the external communication network;
   step 6: the at least one base station calculating an average RSSI value of all of the at least one affiliated end device therewith, and then the priority of a connection between one of the affiliated end devices and the at least one base station being determined according to the average RSSI value, the RSSI value and the relative location of the affiliated end device with respect to the at least one base station;

step 7: the rain server determining which base station the at least one end device should affiliate with, based on the RSSI value or relative location of the at least one end device with respect to each of the at least one base station;

step 8: when the at least one end device is connected with an affiliated base station assigned by the main server, the at least one end device continuing to transmit information attributes including the RSSI.

* * * * *